US012749859B2

(12) United States Patent
Li

(10) Patent No.: US 12,749,859 B2
(45) Date of Patent: Sep. 29, 2026

(54) CONNECTOR ASSEMBLY AND BUSBAR POWER CONNECTOR

(71) Applicant: BIZLINK INTERNATIONAL CORP., New Taipei City (TW)

(72) Inventor: Kuang-Shan Li, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 328 days.

(21) Appl. No.: 18/406,121

(22) Filed: Jan. 6, 2024

(65) Prior Publication Data

US 2025/0226627 A1 Jul. 10, 2025

(51) Int. Cl.
*H01R 25/16* (2006.01)

(52) U.S. Cl.
CPC .................................. *H01R 25/162* (2013.01)

(58) Field of Classification Search
CPC .............. H01R 25/162; H01R 12/7088; H01R 13/4223; H01R 12/721; H01R 12/722; H01R 12/724; H01R 12/732; H01R 24/60; H01R 13/02; H01R 13/187; H01R 13/213; H01R 13/113; H01R 4/646; H05K 7/2039
See application file for complete search history.

(56) References Cited

U.S. PATENT DOCUMENTS

| | | | | |
|---|---|---|---|---|
| 6,234,842 B1 * | 5/2001 | Keay | H01R 4/646 439/620.24 |
| 10,811,800 B1 * | 10/2020 | Blackburn | H01R 12/75 |
| 11,917,797 B2 * | 2/2024 | Shi | H05K 7/209 |
| 2016/0104986 A1 * | 4/2016 | Sheridan | H01R 25/162 439/213 |
| 2022/0159878 A1 * | 5/2022 | Dillman | H05K 7/20509 |
| 2022/0368090 A1 * | 11/2022 | Durse | H01R 13/502 |

FOREIGN PATENT DOCUMENTS

| | | |
|---|---|---|
| CN | 114976708 A | 8/2022 |
| CN | 115084895 A | 9/2022 |
| TW | 1246228 B | 12/2005 |
| TW | 1295518 B | 4/2008 |
| TW | M485540 U | 9/2014 |
| TW | M542263 U | 5/2017 |

* cited by examiner

*Primary Examiner* — Edwin A. Leon
(74) *Attorney, Agent, or Firm* — CKC & Partners Co., LLC

(57) ABSTRACT

A connector assembly includes a terminal module, a cable module, and a heat sink. The terminal module includes a conductive plate and a plurality of terminals. The terminals are coupled to the conductive plate. The cable module includes a plurality of cables. The cables are coupled to the conductive plate and electrically connected to the terminals via the conductive plate. The heat sink is thermally coupled to the conductive plate.

18 Claims, 5 Drawing Sheets

CONNECTOR ASSEMBLY AND BUSBAR POWER CONNECTOR

BACKGROUND

Technical Field

The present disclosure relates to a connector assembly and a busbar power connector.

Description of Related Art

At present, most busbar power connectors solve the heat dissipation problem of terminals by increasing the contact area. For example, crown springs are provided around the terminals to increase the surface area for heat exchange.

However, simply increasing the contact area is no longer able to withstand the heat energy generated by large currents (for example, current intensity greater than 200 amperes). When current flows through, the contact surface between a terminal of a busbar power connector and a corresponding terminal of the mating connector will generate a large amount of heat energy, causing the temperature around the contact surface of the terminal to rise rapidly, thereby reducing the conductive performance of the terminal.

Accordingly, how to provide a connector assembly and a busbar power connector to solve the aforementioned problems becomes an important issue to be solved by those in the industry.

SUMMARY

An aspect of the disclosure is to provide a connector assembly and a busbar power connector that can efficiently solve the aforementioned problems.

According to an embodiment of the disclosure, a connector assembly includes a terminal module, a cable module, and a heat sink. The terminal module includes a conductive plate and a plurality of terminals. The terminals are coupled to the conductive plate. The cable module includes a plurality of cables. The cables are coupled to the conductive plate and electrically connected to the terminals via the conductive plate. The heat sink is thermally coupled to the conductive plate.

In an embodiment of the disclosure, the terminals extend from an edge of the conductive plate. The heat sink is coupled to a surface of the conductive plate and located between the terminals and the cables.

In an embodiment of the disclosure, the heat sink includes a plurality of fins extending away from the surface of the conductive plate.

In an embodiment of the disclosure, the conductive plate and the fins are parts of a unitary structure.

In an embodiment of the disclosure, the heat sink further includes a coupling plate. The coupling plate is connected to the fins and extends above the surface of the conductive plate. The cables include a first group and a second group. The first group of the cables is coupled to the conductive plate. The second group of the cables is coupled to the coupling plate and electrically connected to the terminals sequentially via the heat sink and the conductive plate.

In an embodiment of the disclosure, the fins respectively have end surfaces at an end of the fins. The coupling plate is connected to and extends away from the end surfaces.

In an embodiment of the disclosure, the heat sink further includes an extending plate. The extending plate is connected to the surface of the conductive plate, the end surfaces, and the coupling plate.

In an embodiment of the disclosure, the coupling plate and the extending plate form an L-shaped structure.

In an embodiment of the disclosure, the first group of the cables has connection ends coupled to the conductive plate. The second group of the cables has connection ends coupled to the coupling plate. The connection ends of the second group of the cables are located over the connection ends of the first group of the cables.

In an embodiment of the disclosure, the heat sink includes a conductive base and a plurality of fins. The conductive base is coupled to the surface of the conductive plate. The fins are connected to the conductive base.

In an embodiment of the disclosure, the conductive base is in contact with the surface of the conductive plate. The fins are connected to a side of the conductive base away from the conductive plate.

In an embodiment of the disclosure, the connector assembly further includes a fastening member. The fastening member fastens the conductive base to the conductive plate.

In an embodiment of the disclosure, the conductive plate and the conductive base are parts of a unitary structure.

In an embodiment of the disclosure, the terminals include a first group and a second group. The conductive plate includes a first sub-layer and a second sub-layer. The first sub-layer is coupled to the first group of the terminals and the heat sink. The second sub-layer is coupled to a side of the first sub-layer away from the heat sink. The second group of the terminals is coupled to the second sub-layer. The first group and the second group of terminals are arranged linearly.

In an embodiment of the disclosure, the first group and the second group of terminals are arranged in an alternating manner.

In an embodiment of the disclosure, the connector assembly further includes a second heat sink. The second heat sink is thermally coupled to a side of the second sub-layer away from the first sub-layer.

In an embodiment of the disclosure, the first sub-layer and the second sub-layer are sandwiched between the heat sink and the second heat sink.

In an embodiment of the disclosure, the connector assembly further includes a fastening member. The fastening member passes through the first sub-layer and the second sub-layer and fastens the heat sink and the second heat sink.

According to an embodiment of the disclosure, a busbar power connector includes a housing and two sets of the connector assemblies. The connector assemblies are partially disposed in the housing.

In an embodiment of the disclosure, the housing includes a main portion and two plugging portions. The main portion has a first opening. The conductive plates of the two sets of the connector assemblies are accommodated in the main portion. The cable modules of the two sets of the connector assemblies extend out of the housing from the first opening. The plugging portions are connected to the main portion and respectively have two second openings facing each other. The terminals of one of the two sets of the connector assemblies expose out of the housing from one of the second openings. The terminals of another of the two sets of the connector assemblies expose out of the housing from another of the second openings.

Accordingly, in the connector assembly of the present disclosure, since the terminal module uses the conductive plate to be thermally coupled to the heat sink, the connector assembly can effectively solve the heat dissipation problem of the terminal module. In this way, the busbar power connector using the connector assembly is more suitable for high current applications. In addition, since two groups of the cables of the cable module are respectively coupled to the conductive plate and the coupling plate of the heat sink, the current transmitted by the terminals will be divided by the conductive plate and the heat sink. In this way, the heat generated by the current can be evenly distributed without being locally accumulated in the conductive plate or the heat sink, thereby improving the conductive performance of the connector assembly.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
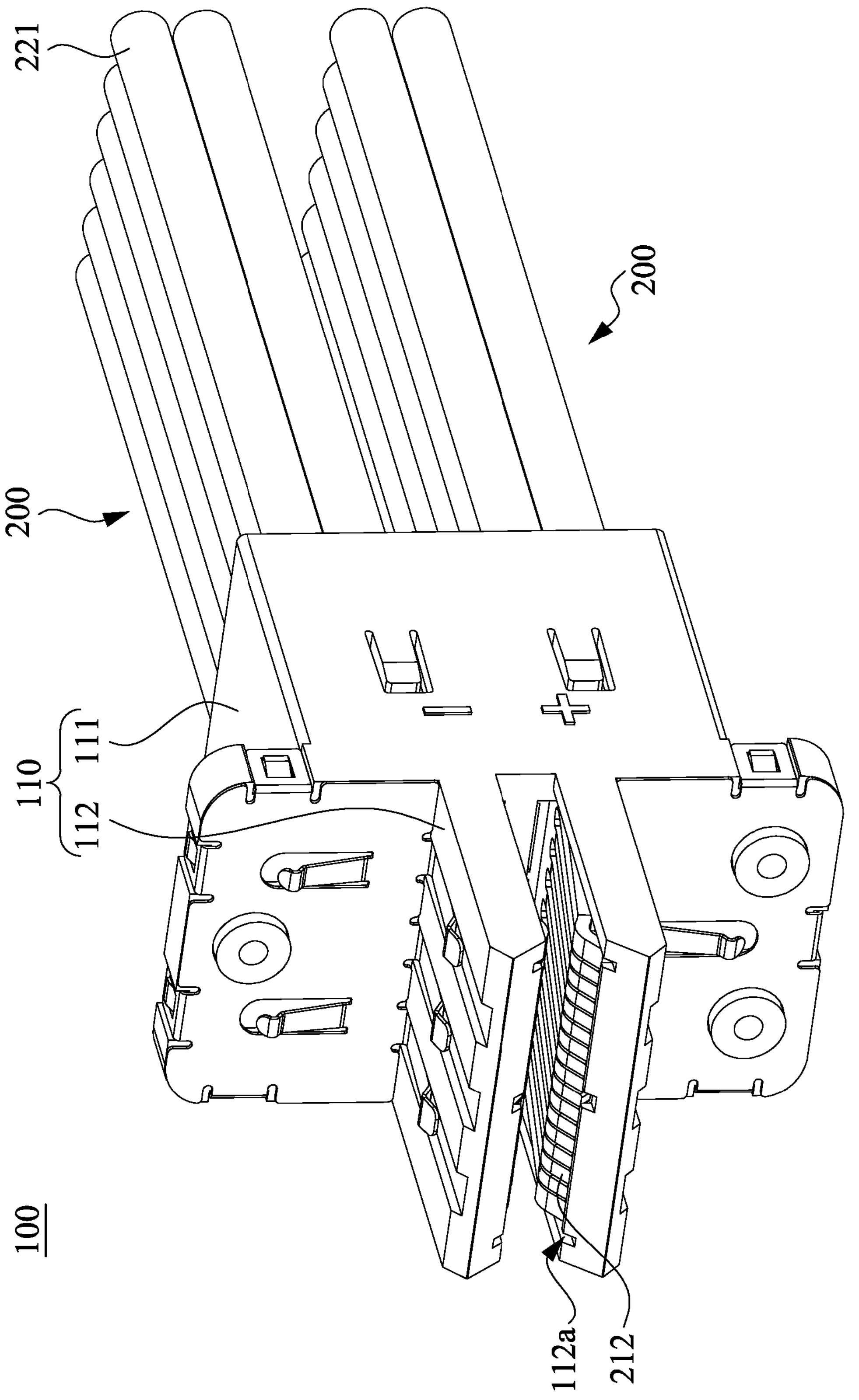
FIG. 1 is a perspective view of a busbar power connector according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
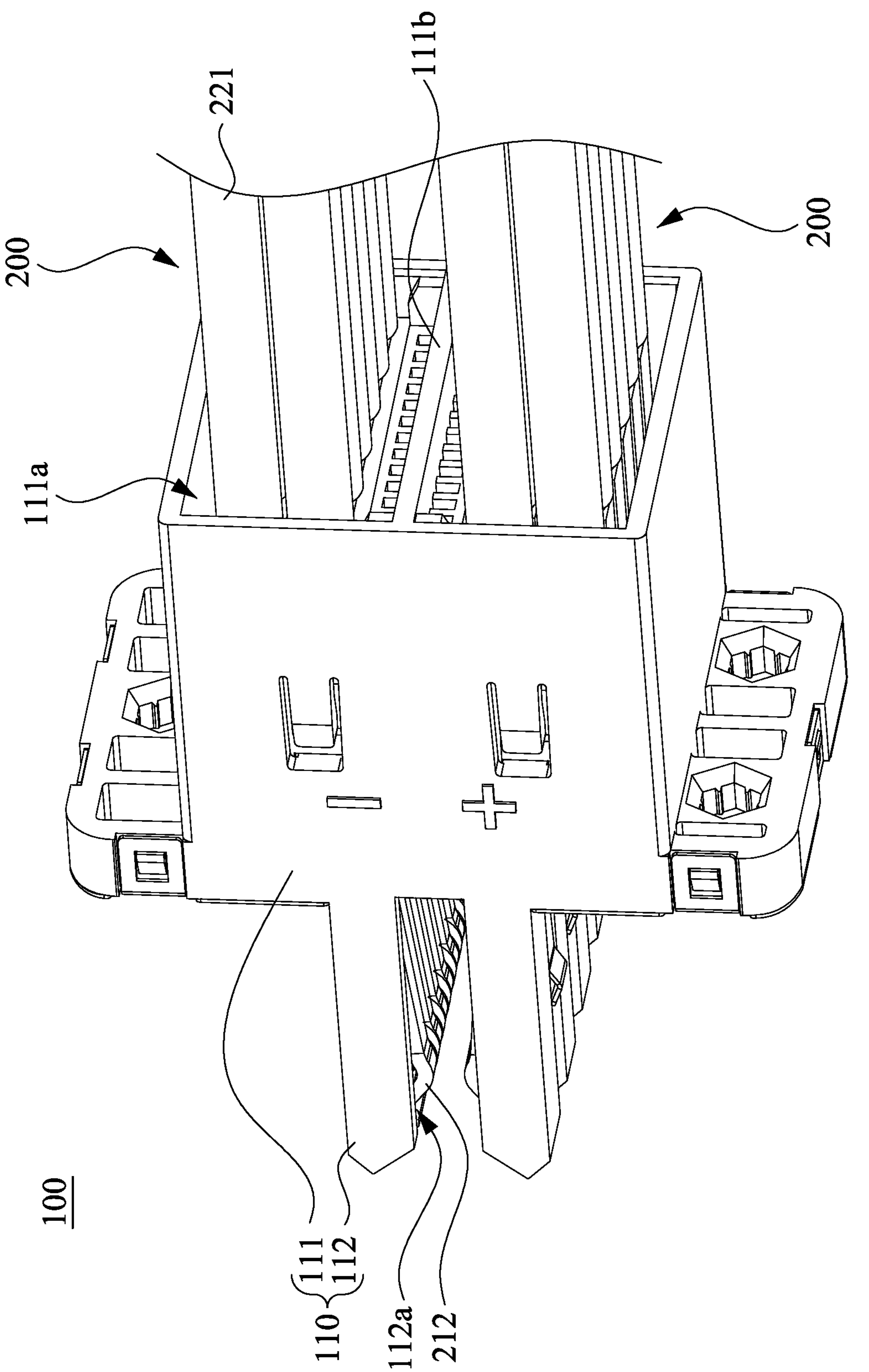
FIG. 2 is another perspective view of the busbar power connector in FIG. 1.

Reference is made to FIGS. 1 and 2. FIG. 1 is a perspective view of a busbar power connector 100 according to an embodiment of the present disclosure. FIG. 2 is another perspective view of the busbar power connector 100 in FIG. 1. As shown in FIGS. 1 and 2, in the present disclosure, the busbar power connector 100 includes a housing 110 and two sets of connector assemblies 200. The connector assemblies 200 are partially disposed in the housing 110. Specifically, the housing 110 includes a main portion 111 and two plugging portions 112. The main portion 111 has a first opening 111*a*. Each of the two sets of connector assemblies 200 includes a conductive plate 211 (referred to FIG. 3) that is accommodated in the main portion 111. Each of the two sets of connector assemblies 200 further includes a cable module 220 that extend out of the housing 110 from the first opening 111*a*. In detail, as shown in FIG. 2, the main portion 111 includes a partition 111*b* that divides the first opening 111*a* into two sub-openings, and the cable modules 220 of the two sets of connector assemblies 200 respectively extend out of the two sub-openings. The plugging portions 112 are connected to the main portion 111 and respectively have two second openings 112*a* facing each other. Terminals 212 of one of the two sets of the connector assemblies 200 expose out of the housing 110 from one of the second openings 112*a*. Terminals 212 of another of the two sets of the connector assemblies 200 expose out of the housing 110 from another of the second openings 112*a*. The plugging portions 112 are configured to plug into the jacks of a receptacle. The two sets of the connector assemblies 200 may be identical and symmetrically disposed in the housing 110.

Figure 3:
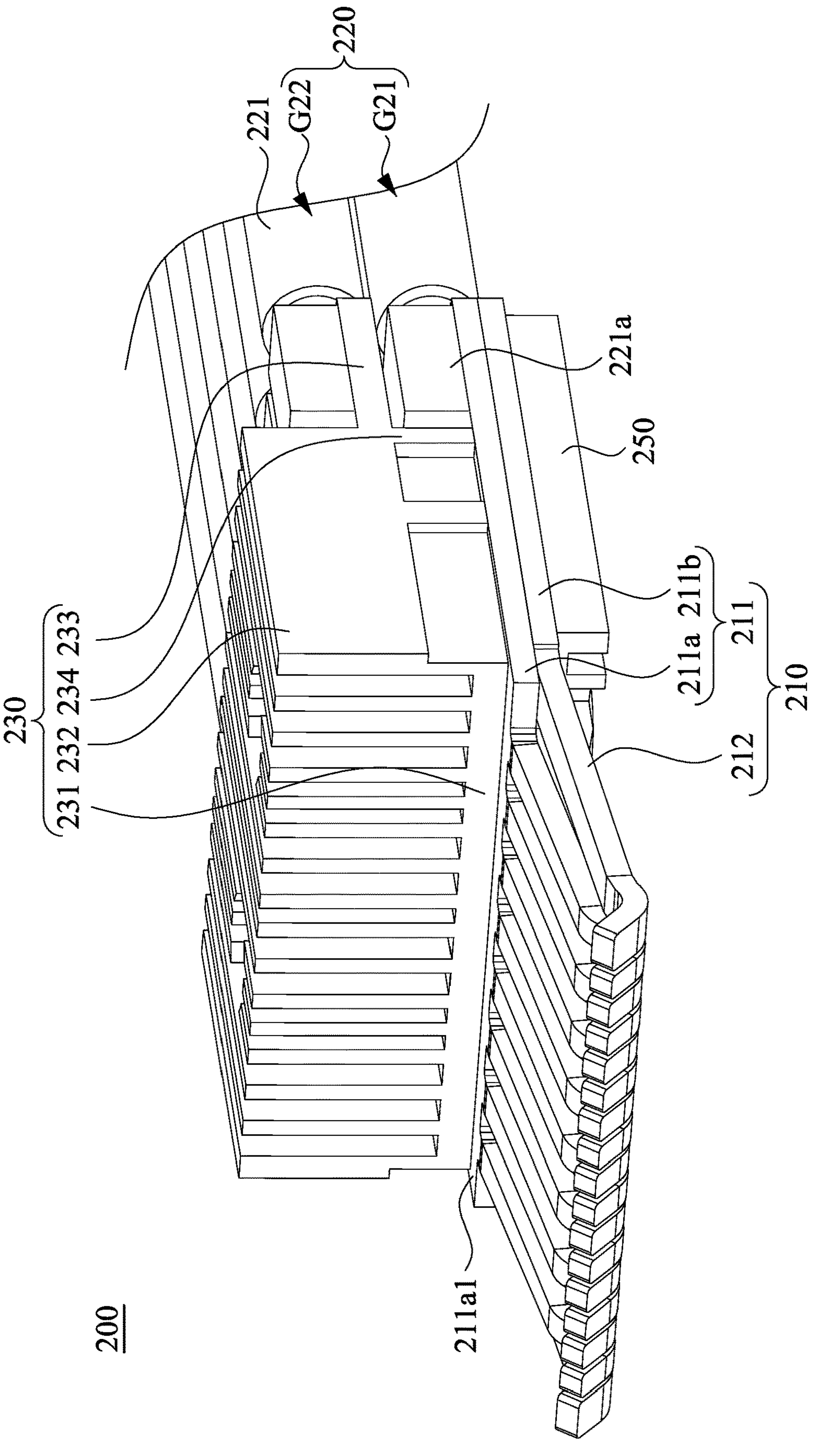
FIG. 3 is a perspective view of a connector assembly according to an embodiment of the present disclosure.
Figure 4:
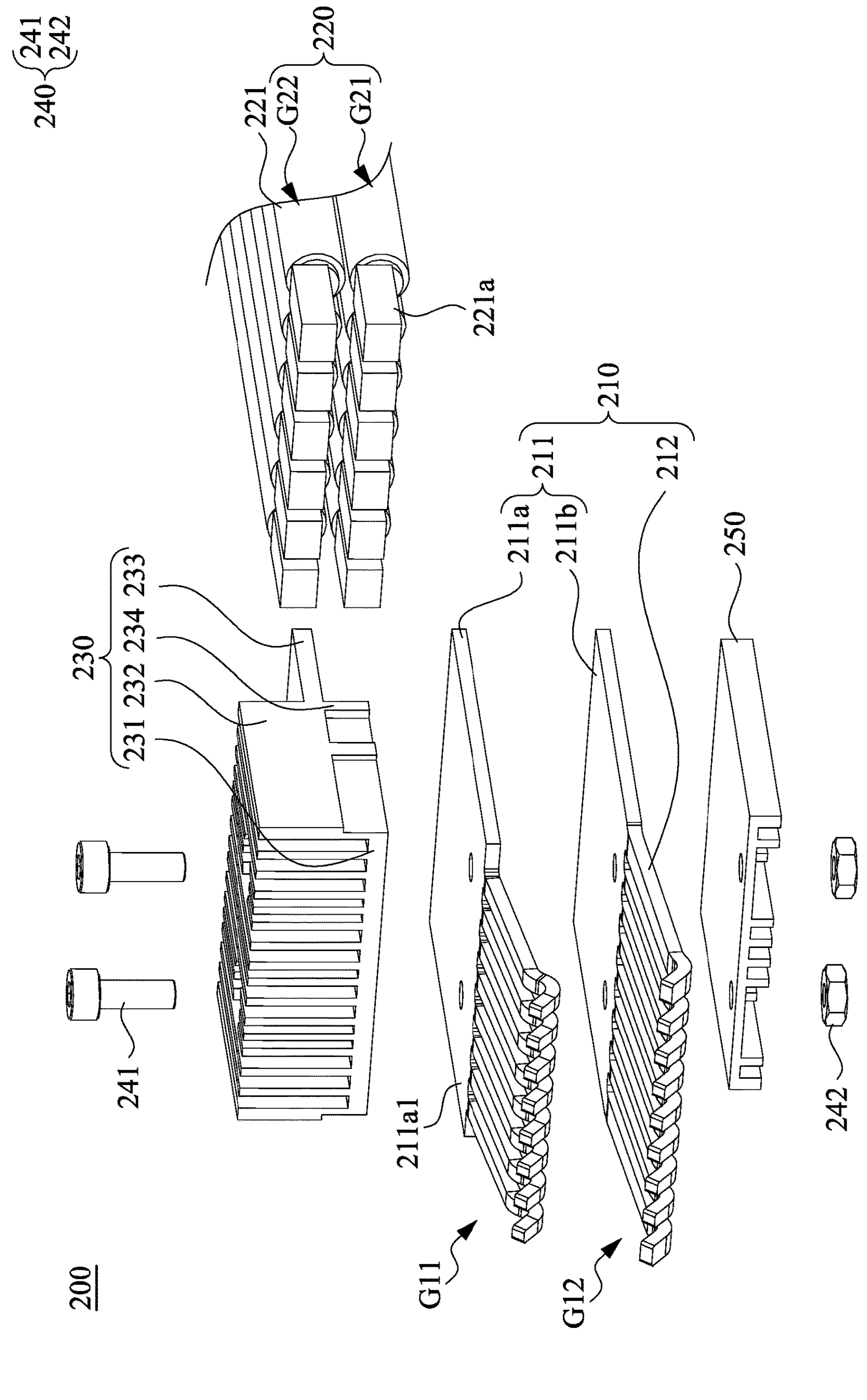
FIG. 4 is an exploded view of the connector assembly in FIG. 3.
Figure 5:
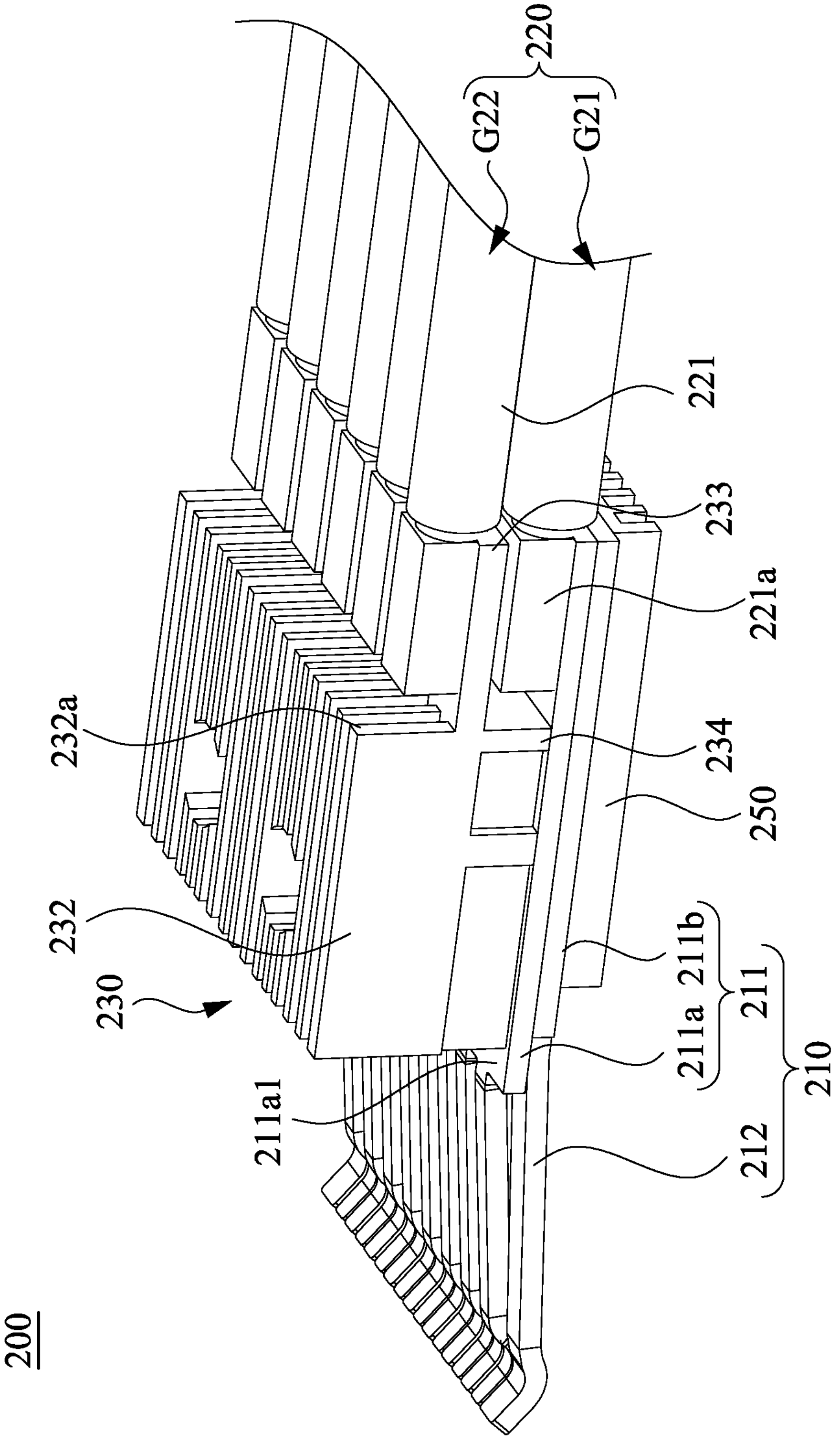
FIG. 5 is another perspective view of the connector assembly in FIG. 3.

Reference is made to FIGS. 3 to 5. FIG. 3 is a perspective view of a connector assembly 200 according to an embodiment of the present disclosure. FIG. 4 is an exploded view of the connector assembly 200 in FIG. 3. FIG. 5 is another perspective view of the connector assembly 200 in FIG. 3. As shown in FIGS. 3 to 5, in the present embodiments, the connector assembly 200 includes a terminal module 210, a cable module 220, and a heat sink 230. The terminal module 210 includes a conductive plate 211 and a plurality of terminals 212. The terminals 212 are coupled to the conductive plate 211. The cable module 220 includes a plurality of cables 221. The cables 221 are coupled to the conductive plate 211 and electrically connected to the terminals 212 via the conductive plate 211. The heat sink 230 is thermally coupled to the conductive plate 211. Specifically, the terminals 212 extend from an edge of the conductive plate 211. The heat sink 230 is coupled to a surface 211*a*1 of the conductive plate 211 and located between the terminals 212 and the cables 221. It can be seen from the foregoing structural configurations that the terminal module 210 uses the conductive plate 211 to be thermally coupled to the heat sink 230, so the connector assembly 200 can effectively solve the heat dissipation problem of the terminal module 210. In this way, the busbar power connector 100 using the connector assemblies 200 is more suitable for high current applications.

As shown in FIGS. 3 to 5, in the present embodiments, the heat sink 230 includes a conductive base 231 and a plurality of fins 232. The conductive base 231 is coupled to the surface 211*a*1 of the conductive plate 211. The fins 232 are connected to the conductive base 231. In detail, the conductive base 231 is in contact with the surface 211*a*1 of the conductive plate 211. The fins 232 are connected to a side of the conductive base 231 away from the conductive plate 211. Each of the fins 232 extends on the surface 211*a*1 of the conductive plate 211 in a first direction, and the fins 232 are sequentially arranged on the surface 211*a*1 of the conductive plate 211 in a second direction. For example, the first direction may be the direction in which the terminals 212, the heat sink 230, and the cables 221 are arranged, but the disclosure is not limited thereto. For example, the second direction may be perpendicular to the first direction, but the disclosure is not limited thereto.

In some embodiments, the conductive plate 211 and the conductive base 231 are parts of a unitary structure. In other words, the conductive plate 211 and the conductive base 231 may be made of a metal material by, for example, an extrusion process, but the disclosure is not limited thereto.

In some embodiments, the conductive base 231 of the heat sink 230 may be omitted while the fins 232 are retained. That is, the fins 232 may extend away from the surface 211*a*1 of the conductive plate 211. The conductive plate 211 and the fins 232 are parts of a unitary structure. In other words, the conductive plate 211 and the fins 232 may be made of a metal material by, for example, an extrusion process, but the disclosure is not limited thereto.

As shown in FIGS. 3 to 5, in the present embodiments, the heat sink 230 further includes a coupling plate 233. The coupling plate 233 is connected to the fins 232 and extends above the surface 211*a*1 of the conductive plate 211. The cables 221 include a first group G21 and a second group G22. The first group G21 of the cables 221 is coupled to the conductive plate 211. The second group G22 of the cables 221 is coupled to the coupling plate 233 and electrically connected to the terminals 212 sequentially via the heat sink 230 and the conductive plate 211. In some embodiments, the first group G21 of the cables 221 are sequentially arranged in a direction parallel to the surface 211*a*1 of the conductive plate 211, and the second group G22 of the cables 221 are sequentially arranged in a direction parallel to a surface of the coupling plate 233 away from the conductive plate 211. In some embodiments, the first group G21 of the cables 221 and the second group G22 of the cables 221 are arranged in a direction perpendicular to the surface 211*a*1 of the conductive plate 211 or the surface of the coupling plate 233 away from the conductive plate 211.

With the structural configurations, the current transmitted by the terminals 212 will be divided by the conductive plate 211 and the heat sink 230. In this way, the heat generated by the current can be evenly distributed without being locally accumulated in the conductive plate 211 or the heat sink 230, thereby improving the conductive performance of the connector assembly 200.

As shown in FIG. 5, in the present embodiments, the fins 232 of the heat sink 230 respectively have end surfaces 232*a* at an end of the fins 232. The end of the fins 232 faces the cables 221. The coupling plate 233 is connected to and extends away from the end surfaces 232*a*. The first group G21 of the cables 221 has connection ends 221*a* coupled to the conductive plate 211. In detail, the connection ends 221*a* of the first group G21 of the cables 221 are coupled to the surface 211*a*1 of the conductive plate 211. The second group G22 of the cables 221 has connection ends 221*a* coupled to the coupling plate 233. In detail, the connection ends 221*a* of the second group G22 of the cables 221 are coupled to a surface of the coupling plate 233 away from the conductive plate 211. The connection ends 221*a* of the second group G22 of the cables 221 are located over the connection ends 221*a* of the first group G21 of the cables 221. In other words, projections of the connection ends 221*a* of the second group G22 of the cables 221 on the surface 211*a*1 of the conductive plate 211 may overlap the projections of the connection ends 221*a* of the first group G21 of the cables 221 on the surface 211*a*1, but the present disclosure is not limited thereto.

As shown in FIGS. 3 to 5, in the present embodiments, the heat sink 230 further includes an extending plate 234. The extending plate 234 is connected to the surface 211*a*1 of the conductive plate 211, the end surfaces 232*a*, and the coupling plate 233. The extending plate 234 is connected between the surface 211*a*1 of the conductive plate 211 and a surface of the coupling plate 233 facing the conductive plate 211.

As shown in FIGS. 3 to 5, in the present embodiments, the coupling plate 233 and the extending plate 234 form an L-shaped structure, but the present disclosure is not limited thereto.

As shown in FIGS. 3 to 5, in the present embodiments, the terminals 212 of the terminal module 210 include a first group G11 and a second group G12. The conductive plate 211 includes a first sub-layer 211*a* and a second sub-layer 211*b*. The surface 211*a*1 is the surface of the first sub-layer 211*a* away from the second sub-layer 211*b*. The first sub-layer 211*a* is coupled to the first group G11 of the terminals 212 and the heat sink 230. The second sub-layer 211*b* is coupled to a side of the first sub-layer 211*a* away from the heat sink 230. The second group G12 of the terminals 212 is coupled to the second sub-layer 211*b*. The first group G11 and the second group G12 of terminals 212 are arranged linearly. The first group G11 and the second group G12 of terminals 212 are arranged in an alternating manner. In other words, any adjacent two of the first group G11 of terminals 212 are interposed by one of the second group G12 of terminals 212, and any adjacent two of the second group G12 of terminals 212 are interposed by one of the first group G11 of terminals 212.

As shown in FIGS. 3 to 5, in the present embodiments, the connector assembly 200 further includes another heat sink 250. The heat sink 250 is thermally coupled to a side of the second sub-layer 211*b* away from the first sub-layer 211*a*. That is, the first sub-layer 211*a* and the second sub-layer 211*b* are sandwiched between the heat sink 230 and the heat sink 250.

In some embodiments, as shown in FIGS. 3 to 5, the heat sink 250 may include portions identical to or similar to the conductive base 231 and the fins 232 of the heat sink 230, but the disclosure is not limited thereto.

As shown in FIG. 4, in the present embodiments, the connector assembly 200 further includes a plurality of fastening member 240. The fastening members 240 pass through the first sub-layer 211*a* and the second sub-layer 211*b* and fasten the heat sink 230 and the heat sink 250. Specifically, each of the fastening members 240 includes a screw 241 and a nut 242. The screw 241 sequentially passes through the heat sink 230 (e.g., the conductive base 231 thereof), the first sub-layer 211*a*, the second sub-layer 211*b*, and the heat sink 250, and a head portion of the screw 241 abuts against a side of the heat sink 230 away from the first sub-layer 211*a*. Correspondingly, the nut 242 is fastened to the screw 241 and abuts against a side of the heat sink 250 away from the second sub-layer 211*b*.

In some other embodiments, screw 241 may sequentially pass through the heat sink 250, the second sub-layer 211*b*, the first sub-layer 211*a*, and the heat sink 230, and a head portion of the screw 241 abuts against a side of the heat sink 250 away from the second sub-layer 211*b*. Correspondingly, the nut 242 is fastened to the screw 241 and abuts against a side of the heat sink 230 away from the first sub-layer 211*a*.

According to the foregoing recitations of the embodiments of the disclosure, it can be seen that in the connector assembly of the present disclosure, since the terminal module uses the conductive plate to be thermally coupled to the heat sink, the connector assembly can effectively solve the heat dissipation problem of the terminal module. In this way, the busbar power connector using the connector assembly is more suitable for high current applications. In addition, since two groups of the cables of the cable module are respectively coupled to the conductive plate and the coupling plate of the heat sink, the current transmitted by the terminals will be divided by the conductive plate and the heat sink. In this way, the heat generated by the current can be evenly distributed without being locally accumulated in the conductive plate or the heat sink, thereby improving the conductive performance of the connector assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A busbar power connector, comprising:

a housing; and two sets of connector assemblies partially disposed in the housing, each of the two sets of the connector assemblies comprising:

a terminal module comprising:

a conductive plate; and a plurality of terminals coupled to the conductive plate;

a cable module comprising a plurality of cables, the cables being coupled to the conductive plate and electrically connected to the terminals via the conductive plate; and a heat sink thermally coupled to the conductive plate, wherein the housing comprises:

a main portion having a first opening, wherein the conductive plates of the two sets of the connector assemblies are accommodated in the main portion, and the cable modules of the two sets of the connector assemblies extend out of the housing from the first opening; and two plugging portions connected to the main portion and respectively having two second openings facing each other, wherein the terminals of one of the two sets of the connector assemblies expose out of the housing from one of the second openings, and the terminals of another of the two sets of the connector assemblies expose out of the housing from another of the second openings.

2. The busbar power connector of claim 1, wherein the terminals of each of the two sets of the connector assemblies extend from an edge of the respective conductive plate, and the respective heat sink is coupled to a surface of the respective conductive plate and located between the respective terminals and the respective cables.

3. The busbar power connector of claim 2, wherein the respective heat sink comprises a plurality of fins extending away from the surface of the respective conductive plate.

4. The busbar power connector of claim 3, wherein the respective conductive plate and the respective fins are parts of a unitary structure.

5. The busbar power connector of claim 3, wherein the respective heat sink further comprises a coupling plate connected to the respective fins and extending above the surface of the respective conductive plate, the respective cables comprise a first group and a second group, the first group of the respective cables is coupled to the respective conductive plate, and the second group of the respective cables is coupled to the respective coupling plate and electrically connected to the respective terminals sequentially via the respective heat sink and the respective conductive plate.

6. The busbar power connector of claim 5, wherein the respective fins respectively have end surfaces at an end of the respective fins, and the respective coupling plate is connected to and extends away from the respective end surfaces.

7. The busbar power connector of claim 6, wherein the respective heat sink further comprises an extending plate connected to the surface of the respective conductive plate, the respective end surfaces, and the respective coupling plate.

8. The busbar power connector of claim 7, wherein the respective coupling plate and the respective extending plate form an L-shaped structure.

9. The busbar power connector of claim 5, wherein the first group of the respective cables has connection ends coupled to the respective conductive plate, the second group of the respective cables has connection ends coupled to the respective coupling plate, and the connection ends of the second group of the respective cables are located over the connection ends of the first group of the respective cables.

10. The busbar power connector of claim 2, wherein the respective heat sink comprises:

a conductive base coupled to the surface of the respective conductive plate; and a plurality of fins connected to the respective conductive base.

11. The busbar power connector of claim 10, wherein the respective conductive base is in contact with the surface of the respective conductive plate, and the respective fins are connected to a side of the respective conductive base away from the respective conductive plate.

12. The busbar power connector of claim 11, wherein each of the two sets of the connector assemblies further comprises a fastening member fastening the respective conductive base to the respective conductive plate.

13. The busbar power connector of claim 10, wherein the respective conductive plate and the respective conductive base are parts of a unitary structure.

14. The busbar power connector of claim 1, wherein the terminals of each of the two sets of the connector assemblies comprise a first group and a second group, and the respective conductive plate comprises:

a first sub-layer coupled to the first group of the respective terminals and the respective heat sink; and a second sub-layer coupled to a side of the respective first sub-layer away from the respective heat sink, the second group of the respective terminals being coupled to the respective second sub-layer, wherein the first group and the second group of respective terminals are arranged linearly.

15. The busbar power connector of claim 14, wherein the first group and the second group of respective terminals are arranged in an alternating manner.

16. The busbar power connector of claim 14, wherein each of the two sets of the connector assemblies further comprises a second heat sink thermally coupled to a side of the respective second sub-layer away from the respective first sub-layer.

17. The busbar power connector of claim 16, wherein the respective first sub-layer and the respective second sub-layer are sandwiched between the respective heat sink and the respective second heat sink.

18. The busbar power connector of claim 17, wherein each of the two sets of the connector assemblies further comprises a fastening member passing through the respective first sub-layer and the respective second sub-layer and fastening the respective heat sink and the respective second heat sink.

* * * * *